United States Patent
Mackey et al.

(10) Patent No.: US 7,607,031 B2
(45) Date of Patent: Oct. 20, 2009

(54) POWER MANAGEMENT IN A COMMUNICATION LINK

(75) Inventors: Paul A. Mackey, Austin, TX (US); Paul C. Miranda, Austin, TX (US); Larry D. Hewitt, Austin, TX (US); Jonathan M. Owen, Northborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 497 days.

(21) Appl. No.: 11/482,269

(22) Filed: Jul. 7, 2006

(65) Prior Publication Data
US 2007/0234080 A1   Oct. 4, 2007

Related U.S. Application Data

(60) Provisional application No. 60/786,546, filed on Mar. 28, 2006, provisional application No. 60/745,503, filed on Apr. 24, 2006.

(51) Int. Cl.
*G06F 1/26* (2006.01)
(52) U.S. Cl. .................. 713/300; 713/310; 713/323
(58) Field of Classification Search .................. 713/300
See application file for complete search history.

(56) References Cited

U.S. PATENT DOCUMENTS

| | | | | |
|---|---|---|---|---|
| 4,964,121 | A * | 10/1990 | Moore | 370/311 |
| 5,446,695 | A * | 8/1995 | Douse et al. | 365/222 |
| 5,812,475 | A | 9/1998 | Lee et al. | |
| 6,065,124 | A * | 5/2000 | Lee | 713/323 |
| 6,324,113 | B1 * | 11/2001 | Tomita | 365/222 |
| 6,457,095 | B1 * | 9/2002 | Volk | 711/105 |
| 6,496,437 | B2 * | 12/2002 | Leung | 365/222 |
| 6,542,959 | B2 | 4/2003 | Tabo | |
| 6,701,446 | B2 | 3/2004 | Tsern et al. | |
| 6,795,362 | B2 | 9/2004 | Nakai et al. | |
| 6,922,369 | B2 | 7/2005 | Kim | |
| 6,944,708 | B2 * | 9/2005 | Frame et al. | 711/106 |
| 6,959,013 | B1 * | 10/2005 | Muller et al. | 370/512 |
| 7,043,258 | B2 * | 5/2006 | Haddrell | 455/456.6 |
| 7,313,712 | B2 * | 12/2007 | Cherukuri et al. | 713/324 |
| 7,320,082 | B2 * | 1/2008 | Tsern et al. | 713/500 |
| 7,461,320 | B2 | 12/2008 | Klein | |

(Continued)

OTHER PUBLICATIONS

"HyperTransport(TM) I/O Link Specification, Revision 2.00b," Document #HTC20031217-0036-0009, HyperTransport Technology Consortium, Apr. 27, 2005, 325 pages.

(Continued)

*Primary Examiner*—Nitin C Patel
(74) *Attorney, Agent, or Firm*—Zagorin O'Brien Graham LLP (57) ABSTRACT

A computer system includes a first and a second integrated circuit coupled by a communication link. The communication link operates in a power savings mode in which data is not transmitted over the link. Periodically, the communication link enters a training phase in which training patterns are transmitted over the communication link for a predetermined time period. The communication link returns to the power savings mode after the predetermined time period has elapsed. At least one sideband signal, separate from the communication link, and coupled between the first and second integrated circuits, is used to indicate when to enter the training phase from the power savings mode and exit the training phase and return to the power savings mode.

17 Claims, 8 Drawing Sheets

U.S. PATENT DOCUMENTS

2004/0103333 A1* 5/2004 Martwick et al. ........... 713/400
2004/0196873 A1 10/2004 Barkaro
2006/0045031 A1* 3/2006 Hickey et al. ............... 370/266
2007/0232254 A1 10/2007 Mackey et al.

OTHER PUBLICATIONS

Non-Final Office Action mailed Jan. 27, 2009 for U.S. Appl. No. 11/482,211, 15 pages.

* cited by examiner

| BIT TIME | 7 | 6 | 5 | 4 | 3 | 2 | 1 | 0 |
|---|---|---|---|---|---|---|---|---|
| 0 | Seqld[3:2] | | Cmd[5:0] | | | | | |
| 1 | PassPW | Seqld[1:0] | | UnitID[4:0] | | | | |
| 2 | Count[1:0] | | Reserved | Data Error | Chain | Reserved | | |
| 3 | Rsv | | | | | | Count[3:2] | |
| 4 | SysMgtCmd[7:0] | | | | | | | |
| 5 | Addr[23:20] | | | | SysMgtCmd[11:8] | | | |
| 6 | Addr[31:24] | | | | | | | |
| 7 | Addr[39:32] | | | | | | | |

POWER MANAGEMENT IN A COMMUNICATION LINK

CROSS-REFERENCE TO RELATED APPLICATION(S)

This application claims benefit under 35 U.S.C. § 119 of provisional application No. 60/786,546, filed Mar. 28, 2006, entitled "Method and Apparatus for Link Operations," naming Gerry R. Talbot, Paul Miranda, Mark D. Hummel, William A. Hughes, and Larry D. Hewitt as inventors, which application is incorporated by reference herein. This application also claims benefit under 35 U.S.C. § 119 of provisional application No. 60/745,503, filed Apr. 24, 2006, entitled "Power Management in a Communication Link," naming Paul A. Mackey, Paul C. Miranda, Larry D. Hewitt, and Jonathan M. Owen as inventors.

BACKGROUND

1. Field of the Invention

This application is related to computer systems and more particularly to power management techniques in computer systems.

2. Description of the Related Art

Power consumption and associated performance and thermal issues are considerations for every computer system design. Many power saving techniques have been introduced to save power and mitigate the impact of thermal and battery power constraints. Mobile applications that are battery powered are particularly sensitive to power considerations. While power consumption issues are most important for battery powered systems, power consumption issues are also important for all types of computer systems. For example, while battery life may not be a consideration for desktop computers, thermal considerations are also an important criteria. In particular, for desktop computers, the hotter they run, the more likely fans are turned on to try and cool the system, which results in fan noise or frequent cycling of the fans, which may be objectionable to the computer user. In addition, saving power can have real economic benefits in terms of reduced electricity costs. Further, reduced power consumption and lower operating temperatures can improve system reliability. Reduced power consumption and lower operating temperatures can also allow for higher density server farms.

In order to continue to improve power management capabilities, it would be desirable to provide flexible power management techniques that exploit evolving capabilities in computer systems.

SUMMARY

Accordingly, in one embodiment, a method is provided for operating one or more portions of a communication link in a power savings state, periodically entering a training phase in which training patterns for use by receive circuits are transmitted over the one or more portions of the communication link for a predetermined length of time; and returning to the power savings mode after the predetermined length of time has elapsed. One or more sideband signals may be used to indicate when to enter and exit the training phase. The interval in which to remain in the power savings mode before a refresh operation in which training patterns are sent may be programmable as well as the length of time to remain in the training phase.

In another embodiment an integrated circuit is provided that includes a transmit and a receive interface for coupling to a communication link. The transmit and receive interfaces are operable, while the communication link is in a power savings mode, to periodically enter a training phase in which training patterns are transmitted and received over the communication link for a predetermined length of time. After the predetermined length of time has elapsed, the transmit and receive interfaces are further operable to return to the power savings mode. The integrated circuit may further include a programmable register specifying the predetermined length of time for being in the training phase as well as a programmable interval register specifying the time to remain in the power savings state before entering each training phase.

An embodiment of the invention may use sideband signal(s) to indicate when to enter and exit the training phase. Thus, the integrated circuit may also include an output terminal coupled to supply an indication on a sideband signal, separate from the communication link, to exit the training phase and return to the power savings mode. The integrated circuit may instead receive the sideband signal and thus include an input terminal coupled to receive the sideband signal, separate from the communication link, and enter the training phase in response to the indication on the sideband signal. The integrated circuit may also be responsive to an indication on a sideband signal to exit the training phase and return to the power savings mode. The integrated circuit may source the indication to enter the training phase and thus include an output terminal coupled to supply an indication on a sideband signal, separate from the communication link, to enter the training phase from the power savings mode in response to expiration of a time period specified by the value of the interval register.

In still another embodiment a computer system is provided that includes a first and a second integrated circuit. A communication link couples the first and second integrated circuits. The first and second integrated circuits are operable to exit a power savings mode for the communication link, enter a training phase in which training patterns are transmitted over the communication link for a predetermined time period and return to the power savings mode after the predetermined time period has elapsed. In an embodiment the first and second integrated circuits enter the training phase periodically from the power savings mode according to a programmable interval register located in at least one of the first and second integrated circuits. The computer system may further include at least one sideband signal, separate from the communication link, and coupled between the first and second integrated circuits, at least one of the integrated circuits being responsive to a first indication on the at least one sideband signal to enter the training phase and a second indication on the at least one sideband signal to exit the training phase and return to the power savings mode.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
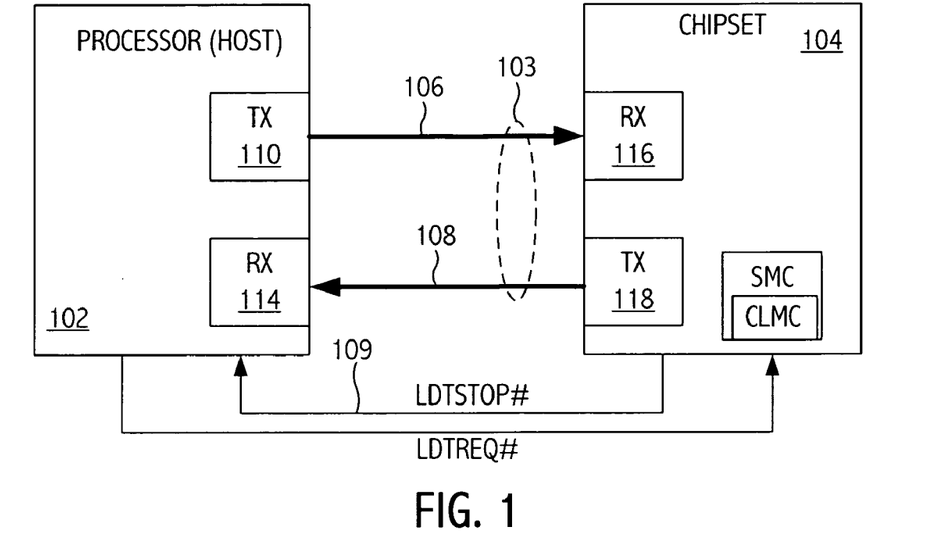
FIG. 1 illustrates an embodiment of a high level block diagram of a portion of a computer system in which power management capabilities described herein may be utilized.

Referring to FIG. 1, an exemplary environment is shown in which various embodiments of power management capabilities described herein may be utilized. Referring to FIG. 1, processor 102 communicates with a chip set integrated circuit 104 by an exemplary communication link 103. The communication link 103 connects transmit interface 110 and receive interface 116 and transmit interface 118 with receive interface 114 via uni-directional communications paths 106 and 108, respectively. In addition, sideband signals 107 (LDTREQ#) and 109 (LDTSTOP#) may be utilized in conjunction with one or more embodiments of the power management system described herein. In order to save power in the system, various portions of the communication link 103 can be disconnected as described further herein. In addition, as described further herein, when the communication link or portion thereof is in power savings state, the latency associated with changing the communication link back to a normal operational mode can be optimized for particular system needs.

Figure 2:
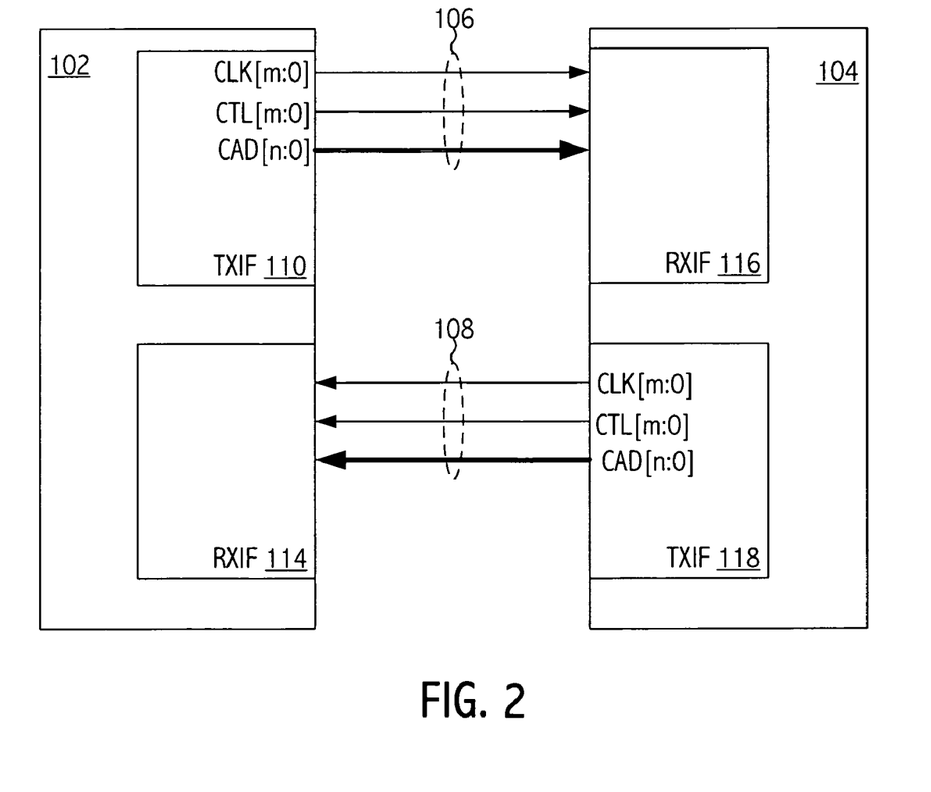
FIG. 2 illustrates additional details of the communication link of FIG. 1 consistent with one or more embodiments of the present invention.

It is helpful to understand additional details about the exemplary communication link 103 before describing how portions of the communication link 103 can be placed in a power savings mode. Referring to FIG. 2, each of the communications paths 106 and 108 includes signal lines for one or more clock signals (e.g., CLK[m:0]), one or more control signals (e.g., CTL[m:0]), and data signals (e.g., n-bits of commands, addresses, or data, i.e., CAD[n:0]). Those individual communications paths may use single-ended or differential signaling. In a preferred embodiment, a separate clock signal line (CLK) and a control signal line (CTL) is provided for each 8 bits of CAD. In addition, in certain embodiments, the number of CAD lines may be 2, 4, 8, 16, or 32. For 2, 4, and 8 bit CAD widths a single CLK and CTL line are provided (i.e., for CTL[m:0] and CLK[m:0], m=0). In addition, the link may be configured asymmetrically in that the width of the path 106 may be different from the width of the path 108. As described further herein, a portion of one path, e.g., path 106, may be disconnected to save power while the other path 108 is operating in a normal power mode, or vice versa.

In at least one embodiment of the invention, a bit-time, corresponding to individual signals of CAD[n:0] and CTL, is half a clock period in duration, i.e., two data bits (e.g., CAD [n:0] bits or CTL bits) are transmitted on a corresponding communications path per clock cycle (e.g., a period of CLK). However, the teachings herein may be used for bit-times having one clock period in duration (i.e., one data bit is transmitted on a corresponding communications path per clock cycle) or for other suitable bit-time durations. Communications paths 106 and 108 are uni-directional, i.e., communications path 106 provides a path from processor 102 to chipset integrated circuit 104 and communications path 108 provides a path to integrated circuit 102 from integrated circuit 104. However, certain of the techniques described herein may be applied to full-duplex communications paths.

Figure 3:
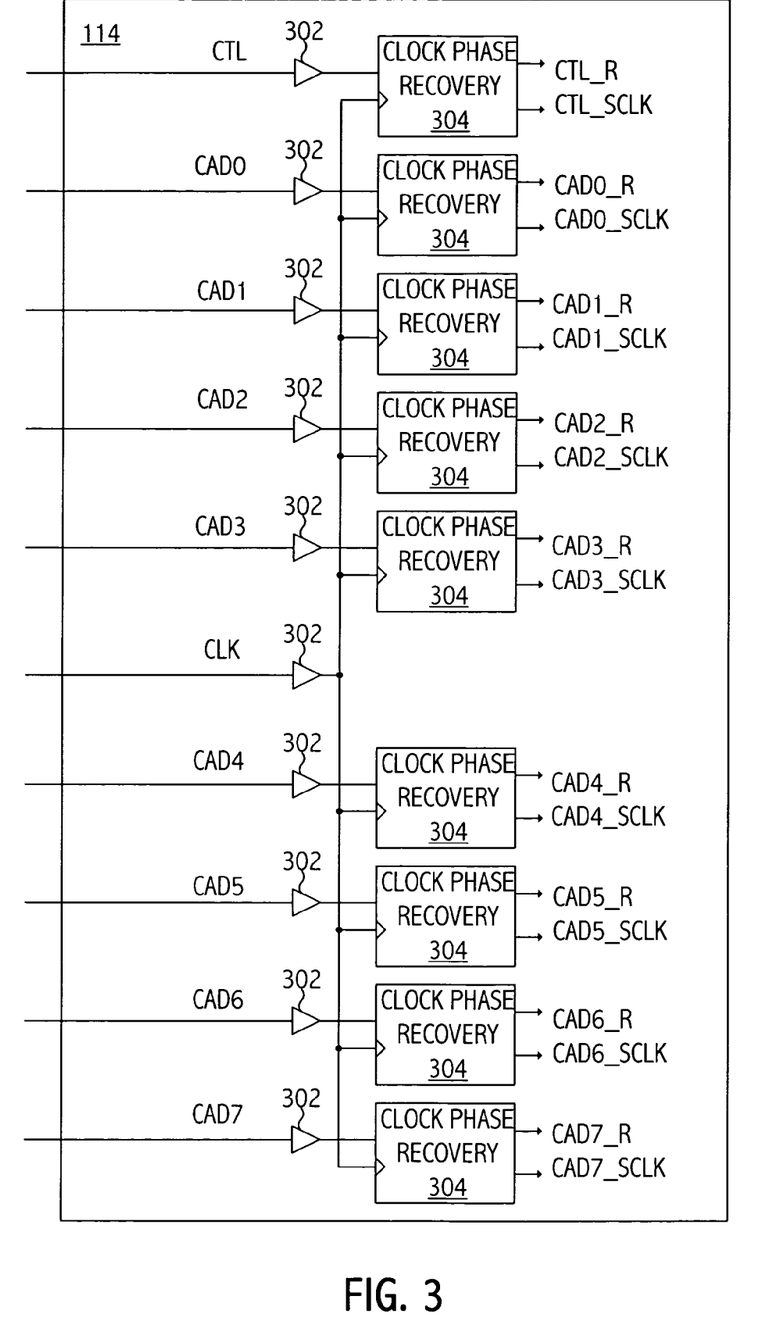
FIG. 3 illustrates a block diagram of a portion of a communication link receive path on an integrated circuit device consistent with one or more embodiments of the present invention.

Referring to FIG. 3, the exemplary, individual communications paths, CLK, CTL, and CAD[7:0] in integrated circuit 102 are received by individual receivers 302 and individual clock phase recovery circuits 304 in receive interface 114. Receivers 302 may perform signal equalization, signal level shifting, noise reduction, or other appropriate signal processing functions. Exemplary clock phase recovery circuits 304 individually receive a received clock signal (e.g., CLK) in addition to a respective, received data signal (e.g., CTL, CAD0, CAD1, ..., CAD7). Clock phase recovery circuits 304 generate corresponding sample clocks (e.g., CTL_SCLK, CAD0_SCLK, CAD1_SCLK, ..., CAD7_SCLK) and provide the recovered data (e.g., CTL_R, CAD0_R, CAD1_R, ... CAD7_R) to other circuitry of receive interface 114. An individual sample clock signal (e.g., CAD4_SCLK) is a dynamically delayed version of the received clock signal (e.g., CLK), which is dynamically delayed based at least in part on a phase difference between the received clock signal and the corresponding received data signal (e.g., CAD4).

In at least one embodiment, individual clock phase recovery circuits 304 generate a sample clock signal for sampling the received data signal at the center of a data eye of the received data signal. The phase difference between the received clock signal and the received data signal may be nonstationary, i.e., this phase difference varies during a period of communication link operation. Thus, the delay applied to the received clock signal to generate the sample clock signal is adjusted during the period of communication link operation, accordingly.

Figure 4:
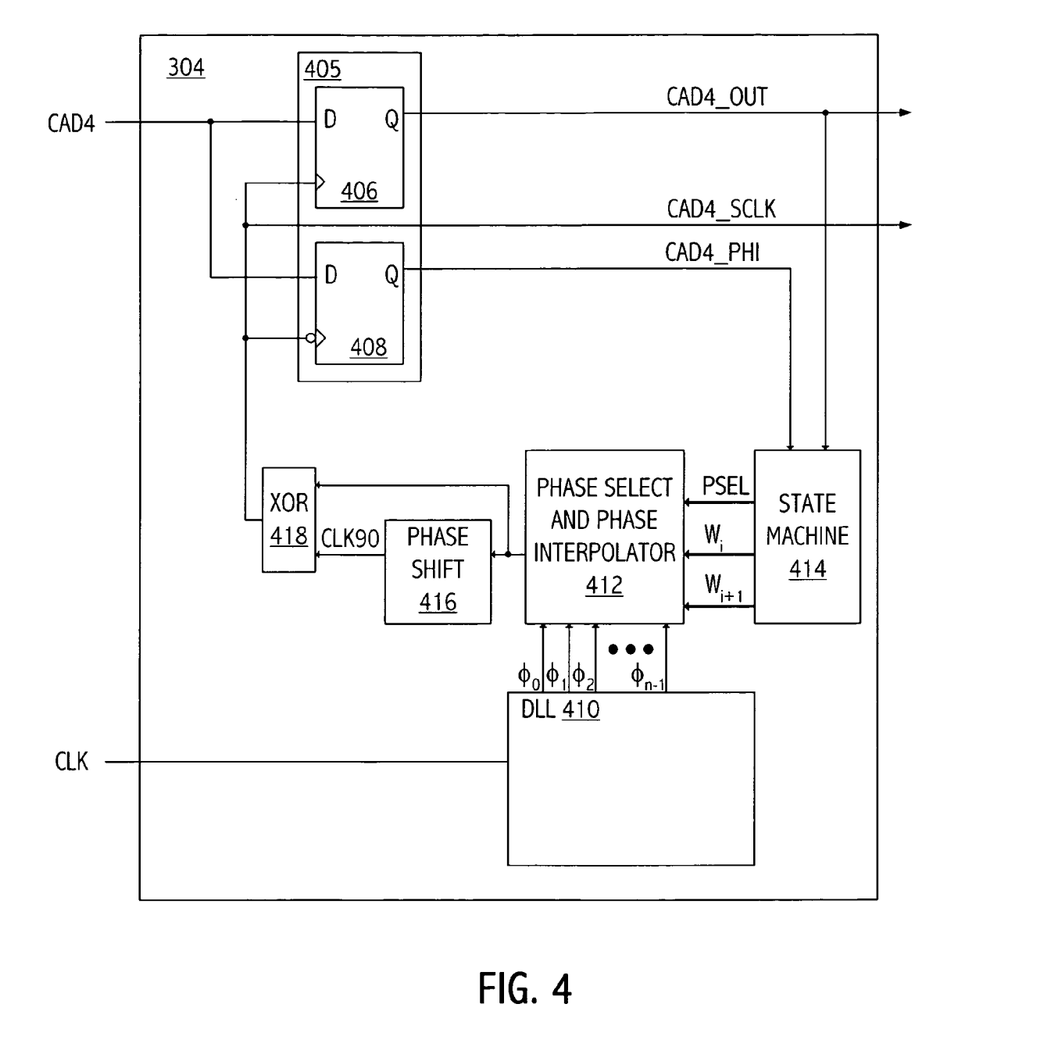
FIG. 4 illustrates a block diagram of an exemplary clock phase recovery circuit consistent with one or more embodiments of the present invention.

An exemplary clock phase recovery circuit (e.g., clock phase recovery circuit 304), consistent with at least one embodiment of the invention, is illustrated in FIG. 4. Clock phase recovery circuit 304 recovers phase information from the received data signal (e.g., CAD4) and the received clock signal (e.g., CLK) to generate a sample clock signal (e.g., CAD4_SCLK) and a sampled data signal (CAD4_OUT). Phase detector 405 includes two flip-flops (e.g., flip-flop 406 and flip-flop 408) that sample the received data signal based on the sample clock signal (e.g., CAD4_SCLK) 180° out of phase with each other. Phase detector 405 provides two signals: a sampled received data signal and a signal providing phase information, e.g., CAD4_OUT and CAD4_PHI, respectively. Those signals are indicative of the phase difference between the received data signal and the received clock signal and are provided to state machine 414.

State machine circuit 414 generates digital control signals (e.g., PSEL, $W_i$, and $W_{i+1}$) for adjusting the sample clock signal based on CAD4_OUT and CAD4_PHI. State machine circuit 414 controls a phase selection and phase interpolation circuit, (e.g., phase select and phase interpolator circuit 412) to generate the sample clock signal based at least in part on the received clock signal to generate the sample clock signal having a target phase relationship to the received data signal. For example, state machine 414 may generate control signals PSEL, $W_i$, and $W_{i+1}$ to apply an appropriate delay to the received clock signal to generate the sample clock signal to sample the received data signal in substantially the center of the data eye. State machine 414 determines whether the phase of the sample clock signal is early or late with respect to the received data signal and issues a phase change request (e.g., appropriate values of PSEL, $W_i$, and $W_{i+1}$) based on this determination. The phase change request applies a delay to shift the phase of the sample clock signal in a direction that aligns the sample clock signal with an appropriate phase of the data. Note that the relationship between phase ($\phi$, in degrees) and delay ($t_D$, in seconds) is $\phi=360*t_D*f$ (where frequency, f, is measured in Hz). In at least one embodiment of state machine 414, digital circuitry included in state machine 414 is responsive to a clock derived from the sample clock signal. However, other clock signals of suitable frequency may be used by state machine 414.

Figure 5:
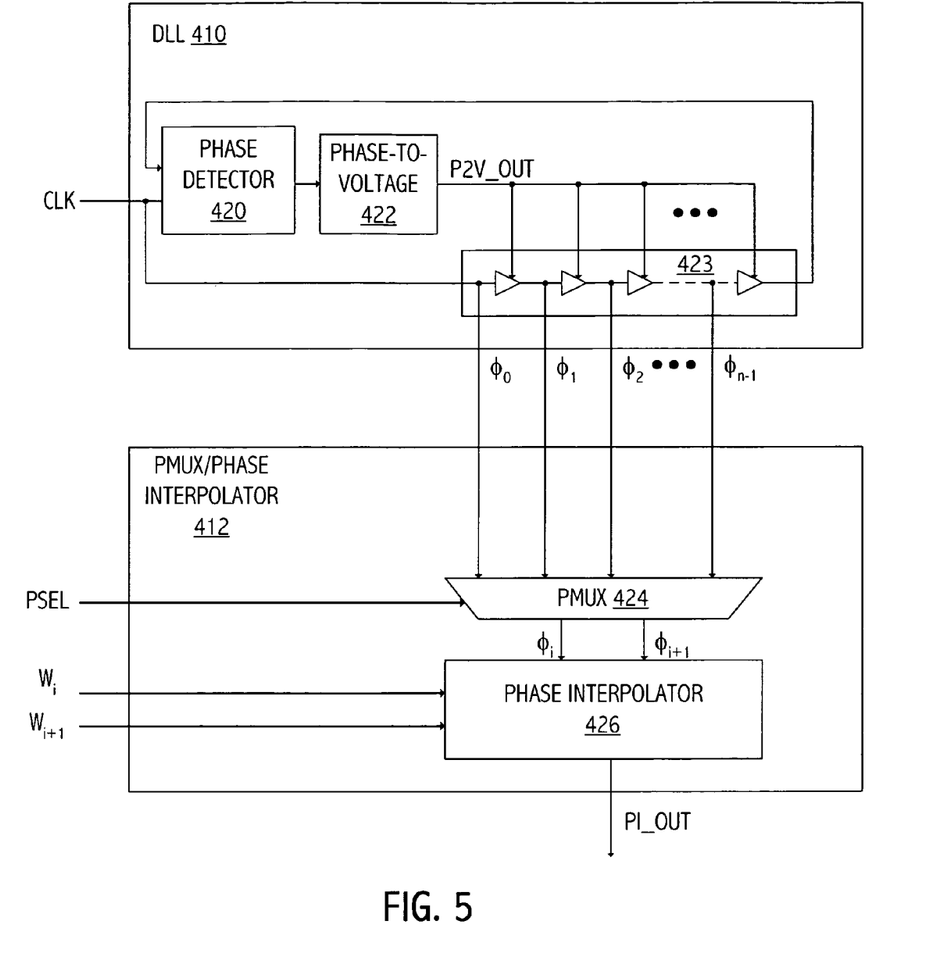
FIG. 5 illustrates a block diagram of an exemplary portion of the clock phase recovery circuit of FIG. 4 consistent with one or more embodiments of the present invention.
Figure 6:
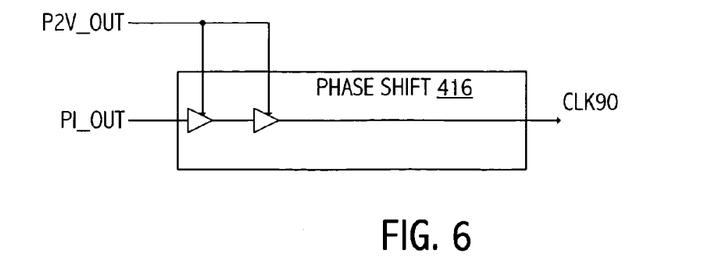
FIG. 6 illustrates a block diagram of an exemplary phase shifting circuit of a clock phase recovery circuit of FIG. 4 consistent with one or more embodiments of the present invention.

In addition to receiving control signals from state machine circuit 414, phase select and phase interpolation circuit 412 receives n phase signals from delay-locked loop (DLL) 410 (e.g., $\phi_0, \phi_1, \ldots, \phi_{n-1}$) which generates these signals based on the received clock signal. Referring to FIG. 5, in at least one embodiment of clock phase recovery circuit 304, DLL 410 includes a delay line (e.g., delay line 423) that is configured to have a total delay equal to the period of the received clock signal. Phase signals $\phi_0, \phi_1, \ldots, \phi_{n-1}$ and their complements are spaced evenly to cover the 360° phase space of the received clock signal.

Delay-locked loop 410 includes a feedback loop including phase detector 420, which may be any suitable phase detector that compares the received clock signal to a delayed version of the received clock signal to generate a phase difference signal. That phase difference is applied to delay line 423. For example, delay line 423 may be a voltage-controlled delay line. The phase difference may be converted by phase-to-voltage circuit 422 into a voltage (e.g., P2V_OUT) that is applied to delay line 323 to adjust the delay of individual delay elements of the delay line to be equivalent and to have a duration that provides a cumulative delay of the delay line equal to the period of the received clock. In at least one embodiment of the invention, the delay line is a current-controlled delay line and the phase difference is converted by an appropriate circuit, accordingly. Phase signals $\phi_0, \phi_1, \ldots, \phi_{n-1}$ are versions of the received clock delayed by equivalent increments from next adjacent phase signals. Those phase signals may be generated by tapping off nodes of the delay line. In an exemplary DLL 410, DLL 410 locks at the 180° point of the received clock signal, which is a half-rate clock signal (e.g., 2.6 GHz at a 5.2 Gbps data rate) to provide a total delay that is equal to one unit interval or bit-time (e.g., 192 ps for a 2.6 GHz received clock signal).

Since DLL 410 outputs only discrete values and the phase difference between the received clock signal and the received data signal may not be exactly one of these discrete values, phase select and phase interpolator circuit 412 selects (e.g., according to PSEL) two adjacent phase signals that have phases with respect to the received clock signal that are nearest to the phase difference to be applied to the received clock signal for use in generating the sample clock signal. Those two adjacent phase signals (e.g., $\phi_i$ and $\phi_{i+1}$) are received by phase interpolator circuit 426 and a phase interpolation of the two adjacent phase signals may be performed to generate an interpolated clock signal (e.g., PI_OUT) that is used to generate the sample clock signal. Phase interpolator circuit 426 may be any suitable phase interpolation circuit. Phase interpolator designs are well known in the art and are typically dependent upon the particular DLL implementation and electrical parameters of the interface in which they operate.

The phase difference between the received clock signal and the received data signal may not fall exactly between the selected adjacent phase signals and phase interpolator 426 may not apply an equal weight to each of the adjacent phase signals. Rather, phase interpolator 426 may receive control signals (e.g., weighting signals $W_i$ and $W_{i+1}$) generated by state machine 414 that indicate an appropriate weighting function for application to phase signals $\phi_i$ and $\phi_{i+1}$ to generate the signal having an intermediate phase, e.g., PI_OUT. Accordingly, PI_OUT is an interpolated version of $\phi_i$ and $\phi_{i+1}$ having a particular phase relationship with the received data signal and is used to generate the sample clock signal, which may be phase aligned with the center of the data eye of the received data signal.

In at least one embodiment of phase interpolator circuit 426, weighting signals $W_i$ and $W_{i+1}$ are four bits wide, i.e., each of the phase signals $\phi_i$ and $\phi_{i+1}$ may be weighted by sixteen different values. For example, DLL 410 provides only the exemplary discrete values 0°, 30°, 60°, 90°, 120°, . . . , 330° phase shift signals. To obtain a phase shift of 10°, which is between the discrete phase shifts of 0° and 30°, state machine 414 provides a value for $W_i$ that weights $\phi_i$ at ⅔ and a value for $W_{i+1}$ that weights $\phi_{i+1}$ at ⅓ (e.g., 0°*⅔+30°*⅓=10°).

Now that some details of an exemplary embodiment of receive circuitry that may be utilized with the refresh operations described herein has been provided, various power management techniques contemplated herein may now be described. In order to save power, various power levels are contemplated that are associated with the communication link. For example, in a normal operational power mode (power mode 0), all the drivers and receivers are functioning. The clock signal (CLK) is being transmitted and received and provided to the DLL, which remains locked to the clock signal. In addition, in the normal operational power mode, the CAD signals are supplied to the phase detector 405 so the phase recovery loop based on the received data in combination with the DLL maintains the sample clock in the appropriate location in the data eye.

In one low power mode of operation (power mode 1), the clock signal (CLK) is still driven and received by the DLL 410 in the clock phase recovery circuit 304. Thus, the DLL 410 remains locked to the CLK signal. However, in that particular low power mode, the CAD lines and the associated control line(s) are "turned off." The electrical nature of how they are turned off can differ among implementations. For example, in some embodiments, being turned off means that the output driver is at high impedance. In other embodiments, the output drivers may be weakly pulled to half the link voltage. In either case, when data is no longer transmitted, the phase recovery from the data can no longer occur.

In still another power savings mode (power mode 2), the CAD lines, associated control line(s) and the CLK line(s) are all turned off. That means that the clock phase recovery in clock phase recovery circuit 304 can no longer take place (neither phase information based on the clock recovery from the data, nor DLL lock using the received clock, both of which are utilized to generate the sample clock).

In the various power savings states, since control information in clock phase recovery circuit 304 may be stored in a digital state, clock phase recovery circuit 304 may maintain the digital state from a previously known digitally locked state of the DLL 410, state machine 414, and phase selector and interpolator 412. Upon resumption of data transmission, the phase recovery from a stored state may be faster than if DLL 410 and the data loop generating the sample clock achieve lock from an initialization state.

In the low-power mode described above (power mode 1), transmit interface 110 may send a clock signal on CLK, but not send data on an individual one of CTL or CAD[n:0]. Delay-locked loop 410 may continue to operate and adjust the delay of the delay line 423. Upon resumption of data transmission, the clock phase recovery will be faster than if DLL 410 achieves lock from a previous state or from an initialization state. In addition, by storing the state associated with the phase interpolator, the sample clock loop recovering the data phase information may more quickly be brought into lock.

In an embodiment of the invention, in order to appropriately train the receive circuitry described above prior to starting normal transmissions, training patterns are supplied to help achieve phase recovery from the data and DLL lock (if necessary due to the clock being turned off) so the sample clock loop can begin to generate the sample clock positioned appropriately within the data eye. Note that embodiments of the invention may scramble the data to provide a sufficient 1's density for phase information to more easily be recovered from the data. One embodiment has four training patterns and a final training marker used to synchronize the first in first out (FIFO) buffer in the receiver. In one embodiment a 40 bit training pattern (3E86B 16E54h) is used for training pattern 0; a 40 bit training pattern (3E86B C5394h) is used for training pattern 1, a 40 bit training pattern (C171B 1AF29h) is used for training pattern 2, and a 40 bit training pattern (3EA94 56C96h) is used for training pattern 3. Note that for capacitively coupled links, values may be different due to the 8b10b encoding to maintain an appropriate number of 1s and 0s in the transmissions. The training marker 4 is DA368 DA368h. On initialization of the link the maximum times spent in each of the training patterns 0, 1, 2, and 3 may be a maximum of 220 microseconds, 1.1 ms, 110 microseconds and 110 microseconds, respectively. Thus, when the link is in a power savings mode, and not receiving data, and possibly not receiving the clock, depending on the particular power mode selected, the receivers will eventually lose lock and training patterns will have to be resent to ensure that lock is achieved before normal transmissions can resume. Thus, the latency for a resume can be significant due to the need for transmitting training patterns to lock the DLL and extract phase information from the received data. For certain applications having low latency requirements, e.g., for isochronous data, it would be beneficial if power savings modes could be implemented to allow low latency requirements to be met.

Two sorts of link power savings conditions will now be described. In a first embodiment, the entire communication link between two devices is disconnected. Assume the appropriate actions have been undertaken to disconnect the link. The particular protocol utilized to disconnect the link will of course depend on the particular link embodiment. In one embodiment, commands along with a sideband signal such as LDTSTOP# are utilized to signal a disconnect sequence. Generally, disconnect sequences ensure that transfers complete in an appropriate manner before the link is disconnected. Note that the changes that can occur to cause the control loops in the receiver to be out of lock typically will happen over a relatively long period of time, due to, e.g., temperature changes or power supply changes. Thus, the longer that a link remains in a disconnected state, training requirements, and thus restart latency, increase.

In order to reduce latency requirements on restarting a disconnected link, one embodiment of the invention contemplates periodically sending training patterns in the power savings states. In particular, the link is periodically "woken up" and training pattern 0 (in one embodiment) is sent across the link for a period of time. That allows the phase recovery circuit 302 to lock (or remain locked) to the data and clock. In addition, digital values that are stored for the phase recovery circuit 304 for the DLL and phase interpolator are fresher and closer to required values. In an embodiment, programmable registers are provided that specify the interval between sending training patterns on the link, as well as the length of time of the training patterns. For example, referring again to FIG. 1, the system management control (SMC) logic includes a centralized link management controller (CLMC) that performs, among other functions, power management control. The CLMC can dynamically configure device specific link features that affect link power consumption through link management (system management) SM commands and an associated LDTSTOP# assertion event for synchronization. In an embodiment, link management SM commands contain a 4-bit link management action field (LMAF). The LMAF code in a link management SM command is used to index into BIOS programmable link management mode (LMM) configuration registers.

In an embodiment, the SMC logic includes the link refresh interval register that specifies the maximum amount of time the power management controller allows the link to spend in the disconnected state before initiating a refresh operation. The details of the refresh operation are described further herein. In addition, the SMC logic may include a register that specifies the length of the refresh, e.g., how long training pattern zero patterns (or other training patterns according to the embodiment) are transferred over the link. Of course, the physical location of the registers in various embodiments may be anywhere in the chipset integrated circuit 104 or other appropriate location. In an embodiment, the interval register and the length register are 6 bits each specifying times of between 0.1 and 300 microseconds. The interval time may be specified to have a minimum of 1 microsecond to ensure that the link remains disconnected for at least 1 microsecond.

Figure 7:
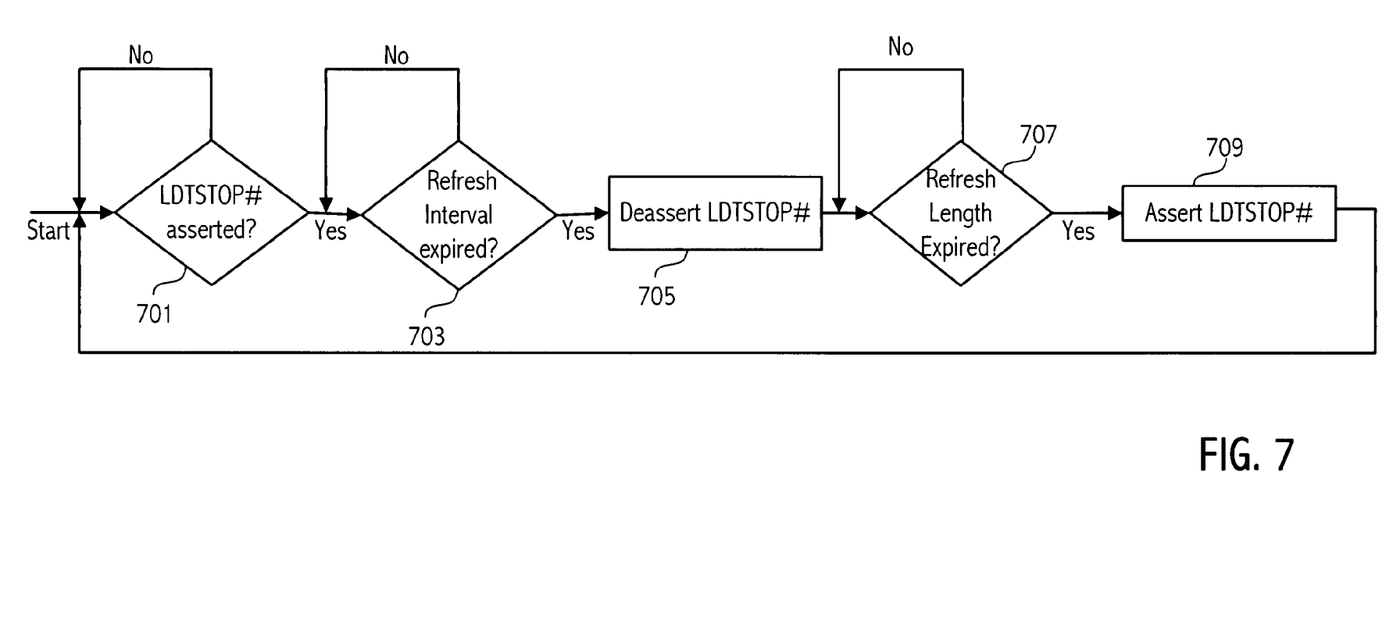
FIG. 7 illustrates a flow diagram of operation of a link refresh operation for a disconnected link.
Figure 8:
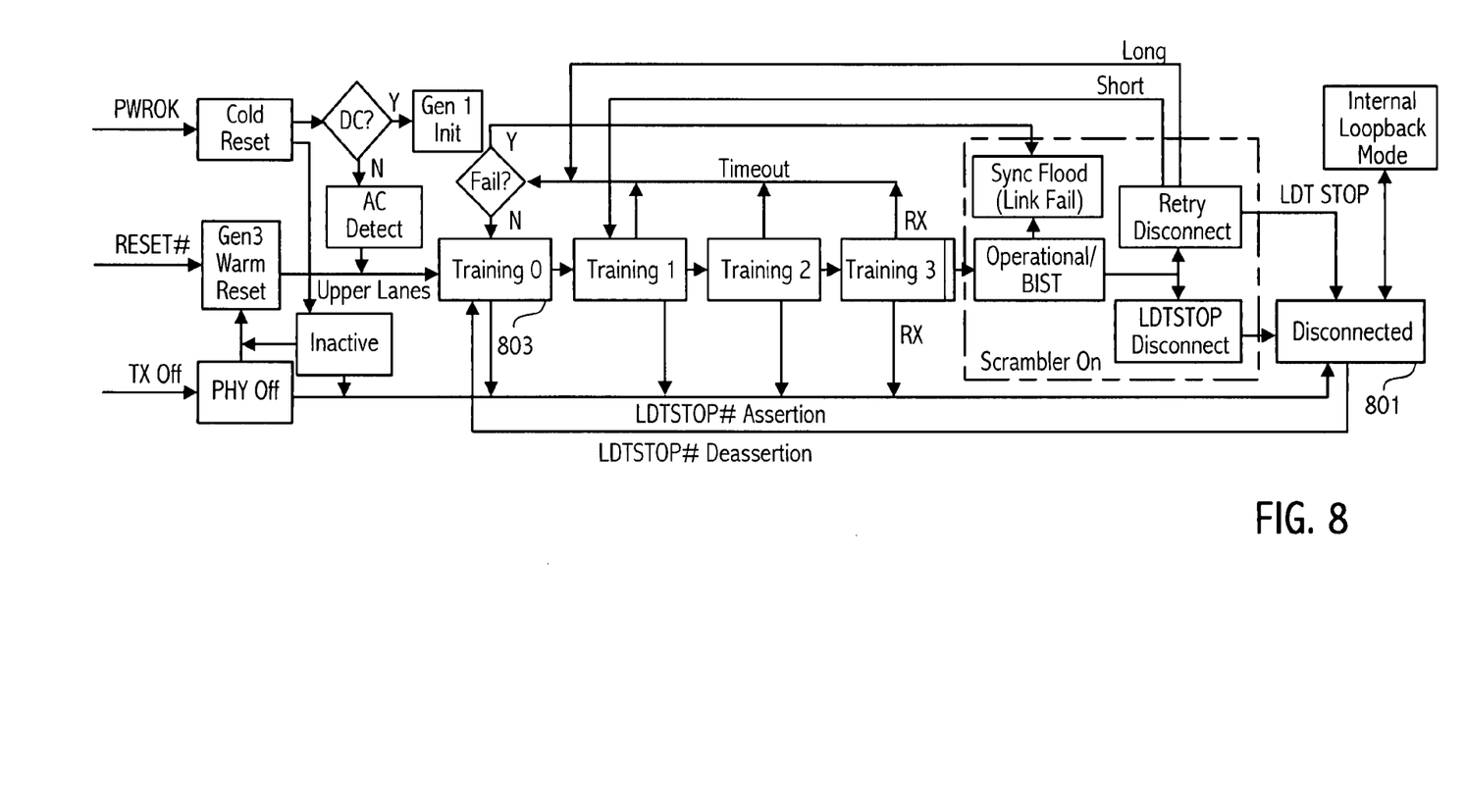
FIG. 8 illustrates a flow diagram of a link refresh operation for a disconnected link showing additional link system operations.

The CLMC can dynamically configure device specific link features that affect power consumption through link management commands. Assume that the CLMC causes a link disconnect through an appropriate command sequence and assertion of LDTSTOP#. In an embodiment a control register bit is utilized to indicate whether a specific device supports disconnect refresh. With reference to FIGS. 7 and 8, the flow charts illustrate the disconnected refresh operation. If LDTSTOP# is asserted in 701, then the link remains in the disconnected state and checks in 703 if the refresh interval has expired. The refresh interval, as explained above, is the maximum amount of time specified that the link can spend in the disconnected state. In one embodiment, the CAD, CTL, and CLK lines are turned off in the disconnected state and in another embodiment the CLK line(s) are left on. As long as the refresh interval length has not been reached, LDTSTOP# remains asserted. Once the CLMC determines that the refresh interval has expired in 703, LDTSTOP# is deasserted in 705. That causes the training pattern 0 to be sent over the link for a length of time determined by the refresh length value. Thus, in 707 the CLMC checks if the refresh length has expired. If so, the CLMC asserts LDTSTOP# in 709 and the link goes back into a disconnected state waiting for the refresh interval to expire.

Another view of this operation is shown in FIG. 8, which shows a flow chart of the link operation. Of particular relevance to disconnect refresh operations, note that when the link is in the disconnected state 801, an LDTSTOP# deassertion causes the link to enter the training pattern 0 sequence 803. In addition, when LDTSTOP# is again asserted at the expiration of the length counter, the link returns to the disconnected state 801.

The ability to refresh the link periodically for a programmable duration at a programmable interval allows the management controller to dynamically optimize link power consumption for resume latency requirements. This allows the CLMC to effectively reduce link reconnection latency by keeping DLL and phase recovery logic trained. Link refresh can be applied periodically to minimize reconnection latency by reducing or eliminating T0 training time at link reconnection. In other embodiments, training patterns in addition to training pattern T0 may be sent. Other embodiments may use separate sideband signals (instead of the same sideband signal) to indicate when to enter and exit the training phase when training patterns are sent and received over the communication link. |Devices that utilize link refresh should have mechanisms for tracking T0 training time requirements. Each device should take into account how much refresh training has occurred (both interval and length) when determining the amount of T0 training time required at link reconnection. Reducing restart latency can be particularly important in certain architectures, such as unified memory architecture (UMA), where graphics data is located in main memory. For a system such as that shown in FIG. 1, the only way to obtain the graphics data is through the link 103.

Link management software should understand the physical receiver T0 training time requirements for both devices coupled to the link, e.g., the host and chipset of FIG. 1, to optimize the power savings and reconnection latency of the link using the link refresh capabilities of the CLMC. The required T0 training time is a function of link idle time and can also be affected by other parameters, e.g., the electrical state of the drivers and receivers during disconnect. In addition, reconnect latency should consider other factors that influence the amount of time actually spent in T0 training for a fixed assertion time of LDTSTOP#, e.g., LDTSTOP# skew, and TX clock stabilization time if the clock was turned off along with the CAD lines.

Refresh of lanes may be utilized in another context. Referring again to FIG. 1, assume that communications paths 106 and 108 each have 16 CAD lines and two clock and control lines. Assume that traffic between chipset 104 and processor 102 becomes very light. In order to save power the power management controller may decrease the width of the paths 106 and 108. That allows the light traffic to be transmitted while achieving power savings from the reduced link width. Thus, a portion of the link remains in normal operational mode while another portion is in a power savings mode. In an embodiment, the portion of the communication link in the normal operational mode is continuously exercised. In other embodiments, the nature of the traffic on the portion of the link in normal operational mode depends on the protocol of the communication link. Assume further that after the width of communication paths 106 and 108 are reduced to eight bits leaving the lanes CAD[7:0] operating along with CLK[0] and CTL[0] on each communication path, the high order bits of each communication path CAD[15:8], CTL[1], and CLK[1] are set to an inactive state after the link width change, which may be electrically the same as the disconnected state. Note that in some embodiments, the CLK line may be left on or off according to the power mode selected. If the CLK line is left on, the DLL for CLK[1] remains locked to the clock line CLK[1].

Dynamic link width change allows the CLMC to dynamically vary the link width using link width override system management (SM) commands and an associated LDTSTOP# assertion event for synchronization. Reducing link width reduces link power consumption based on the electrical state of the inactive lanes, which may be determined by a programmable register. For example, one electrical state may allow the clock to freely run keeping the DLL locked, while another electrical state may shut off both CAD lines and any associated clock lines. Note that dynamic link width events, i.e., dynamic changes to the link width do not update the legacy link width register values (LinkConfiguration[LinkWidthIn/Out]), i.e., those registers specifying the link width for other than dynamic change purposes. Instead, separate registers (dynamic link width in/out registers) or fields within a separate register are used to store the width in/out values from a link width override SM command. These registers (or fields) are used by the link width arbitration logic and should only be updated by hardware when a link width override SM command is received specifying a dynamic link width change. Hardware arbitration logic chooses the smallest link width from LinkConfiguration[LinkWidthIn/Out] and the dynamic link width in/out registers. The in and out widths are separately programmable. The arbitration is independent for width in and width out. That allows asymmetric link width configurations to resolve to the lowest requested width for each uni-directional connection. Note that a link width increase due to a dynamic link width event must retrain the previously inactive lanes.

To minimize the reconnect latency for width increases, inactive lane refresh can be performed periodically or prior to the LDTSTOP# assertion event that synchronizes a link width increase. Thus, using a similar mechanism to that described above with relation to the disconnected state, a power management controller may periodically refresh the inactive portion of the link by entering a training phase in which training patterns are sent over the communication link. A register may be used to specify the refresh interval length (i.e., how long the link remains inactive) and the refresh length (i.e., how long the link transmits training patterns) and thus a counter counts the interval length and ensures that the inactive portion remains inactive only as long as specified by the interval length. However, the mechanism to enter the training phase is different from the disconnect state because a portion of the communication link is still active and in-band communication, i.e., communication over the still active portion of the link, may be used to communicate information indicating to enter or leave the training phase instead of use of a sideband signal such as LDTSTOP#.

Figure 9:
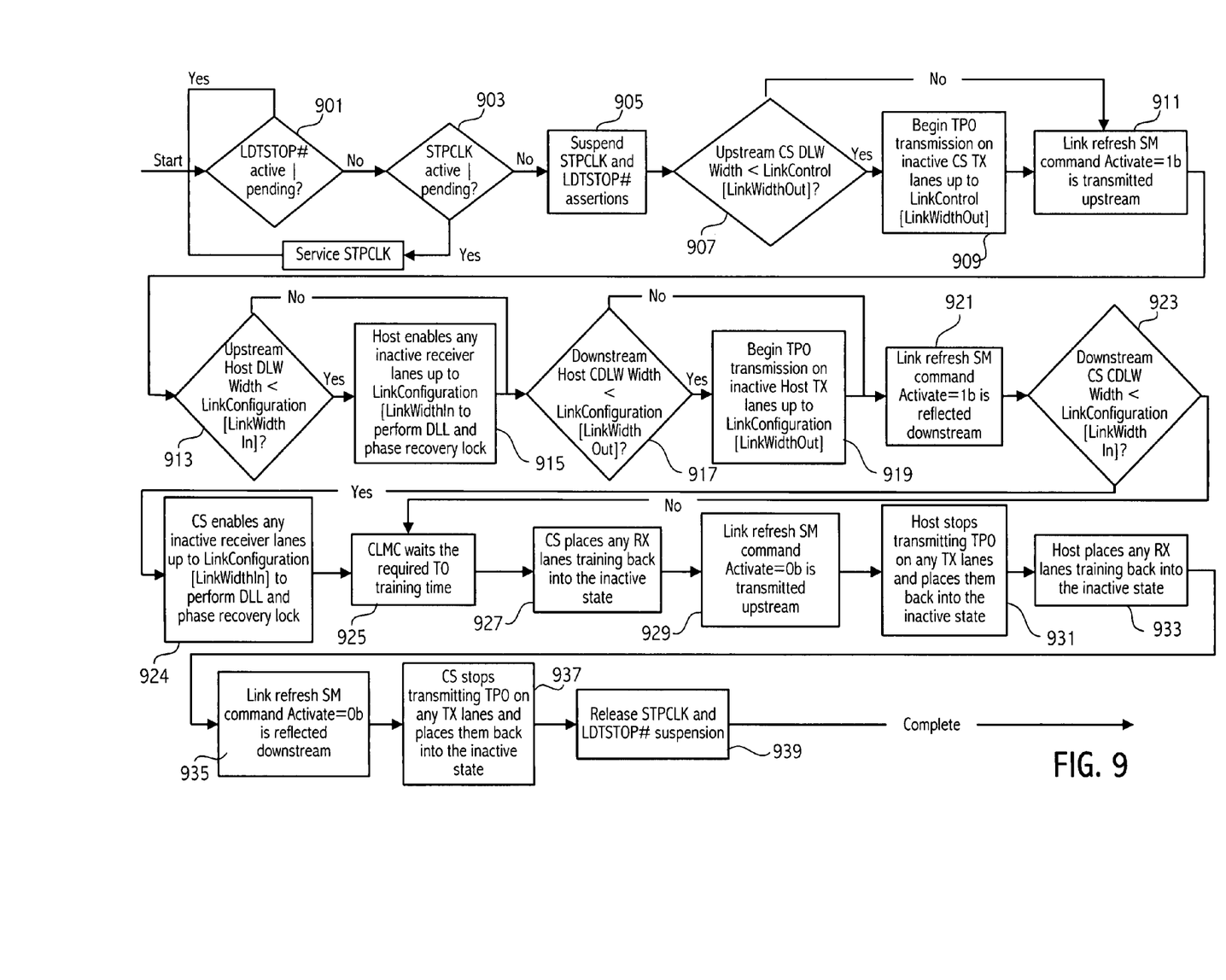
FIG. 9 illustrates a flow diagram of a link refresh operation for inactive lanes of a link.
Figure 10:
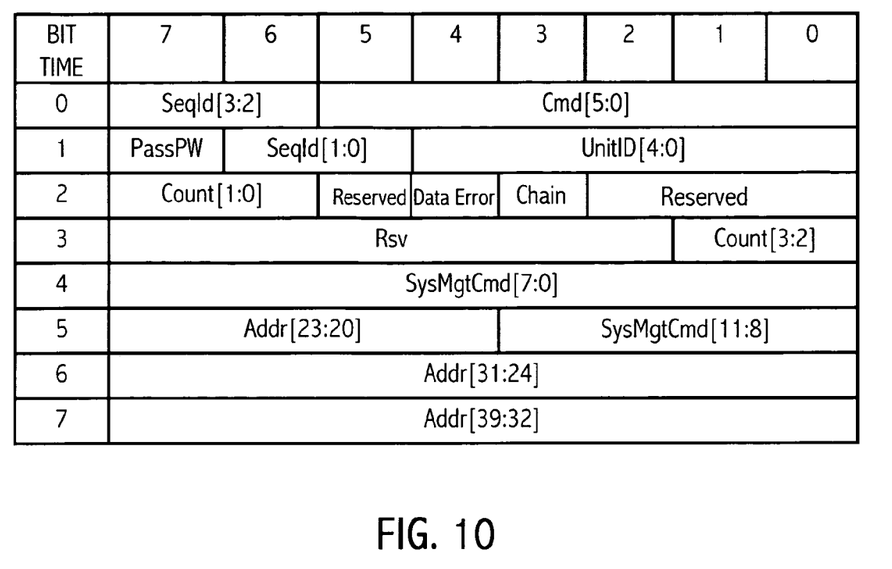
FIG. 10 illustrates an exemplary link packet structure that may contain system management commands useful for link operations described herein.

In particular, referring to FIG. 9 a flow chart illustrates the refresh operation for the inactive portion of a link for the system shown in FIG. 1. Assume that the link width has been reduced from 16 to 8 bits in both the upstream and downstream directions using an in-band command and appropriate assertion of LDTSTOP# to synchronize the change. An exemplary command format that may be used for link commands associated width dynamic link width changes and inactive lane refresh is shown in FIG. 10. The particular command format depends upon the specifics of the link protocol. An exemplary link width override command for the system management command field used to dynamically change the link width for power management (or other) purposes is 0001 00xx xxxx with bits [5:3] specifying the upstream link width and bits [2:0] specifying the downstream link width. Thus, 8 separate link sizes can be specified in the link width registers. Note that additional bits may be utilized to specify additional sizes in other embodiments. Further, the location of the width registers depends on the requirements of specific implementations.

The link width can be reduced symmetrically in both directions. For example, a link may be reduced from 16 to 8 bits in both the upstream and downstream directions as described above. However, it is also possible that the width may be reduced asymmetrically based on heavier link traffic in one direction than the other. That is, the portion of the link that is inactive in an upstream direction may be different from the portion of the link that is inactive in the downstream direction. For example, 16 bits may be fully operational in an upstream direction and only 8 bits operational in the downstream direction. Thus, 8 bits in the downstream direction are inactive.

As mentioned above, separate register(s) are used to specify dynamic link width changes. Thus, separate dynamic link width registers or fields are provided for the upstream and downstream directions. The LinkConfiguration registers specifying the link width for normal operations is unaffected by the dynamic link width command. Thus, for the symmetric link width reduction from 16 to 8 bits, the dynamic link width register written by the in-band change link width command would specify 8 bits for both the upstream and downstream direction while the register specifying link width for normal operations remains at 16 for the upstream and downstream values. For the asymmetric link width change described above, the in-band link width change command would specify 8 bits for the downstream direction and 16 bits for the upstream direction, leaving the register(s) specifying link width for normal operation unchanged.

Returning now to FIG. 9, in 901 and 903, the power management controller checks to make sure that the LDTSTOP# is not active or pending and that STPCLK is not active or pending. STPCLK is a request to stop clocks in the processor for power management purposes. At 905 the ability to assert STPCLK and LDTSTOP# is suspended. Next in 907 a check is made to ensure that the upstream dynamic link width (DLW) specified in the dynamic link width upstream register is less than the upstream legacy width, that is, a check is made to see if the dynamic link width command reduced the width to less than the normal operating width. If yes in 907, the transmitter 118 in the chipset integrated circuit 104 begins transmitting training pattern 0 in 909. If the widths are the same, the CLMC does not begin to transmit training patterns on the inactive portion because there is no upstream inactive portion. The chipset then sends a link refresh system management command to indicate to the processor 102 that refresh is enabled. An exemplary system management link refresh command is 0001 0101 xxxx in the system management command field with bit [3]=1 specifying link refresh is active or enabled and bit [3]=0 specifying that refresh is inactive. The upstream device then checks for the receive width in 913 and in 915 enables inactive receivers that are receiving training pattern 0 to perform DLL and phase recovery lock if the dynamic link width register indicates the width is less than the normal operating width specified in the legacy width register LinkConfiguration[LinkWidthIn]. That is, the check in 913 checks if there are any inactive receivers. Once the host enables any inactive receivers, it checks if there are inactive downstream transmitters in 917, and if so, begins sending training patterns to the downstream device chipset 104 in 919. After beginning to transmit the training patterns, the host device 102 "reflects" the enable link refresh system management command downstream indicating that the host device has received the command and, if appropriate, enabled its receivers and/or turned on its transmitters on the inactive lanes. In 923, on receipt of the system management command, the chipset 104 in 923 checks its receive width to see if there are any inactive receivers and enables any receivers for inactive lanes in 924 to perform DLL and data phase recovery lock. The power management controller then waits until the required training pattern 0 time has expired in 925. Depending on the context, that may be based on a programmable length register shown in FIG. 11 or some other criteria. For example, the programmable length register loads a counter (not shown in FIG. 11) with the contents of the programmable length register and begins counting in 925.

Figure 11:
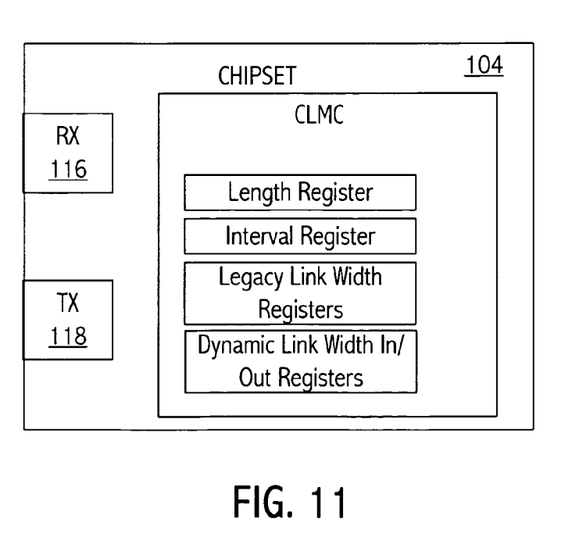
FIG. 11 illustrates exemplary registers that may be utilized in various embodiments of the invention.

After the appropriate training pattern time has expired, the chipset integrated circuit 104 places its receiver (RX) lanes back into the inactive state in 927. The chipset integrated circuit 104 sends an inactivate link refresh SM command in 929. On receipt of the inactivate command, the host 102 stops transmitting training patterns and places its transmitters for the inactive lanes back into the inactive state in 931. The host 102 also places any receive lanes back into the inactive state in 933. As discussed above, that can entail saving the digital state of the control values for the DLL and the data phase recovery circuit. Having completed those tasks, the host 102 reflects the inactivate link refresh command downstream in 935. Once it receives the reflected inactive command, the chipset 104 stops transmitting its training patterns in 937 and releases the suspension of STPCLK and LDTSTOP# in 939. That completes an inactive lane refresh. The controller can enter that refresh state based on an interval register as shown in FIG. 11, which specifies the length of time that the inactive lanes can remain inactive. FIG. 11 also illustrates that the length register and various link width registers specifying upstream and downstream widths may also be located in the CLMC.

Note that the sequence shown in FIG. 9 does not utilize sideband signals and all refresh signaling is sent in-band on the active portion of the link. As pointed out above, the link power management controller initially places a portion of the link in the inactive state by a dynamic width change command, which utilizes an LDTSTOP# signal for synchronization purposes. Note also, that there can be asymmetry in the inactive lanes between the upstream and downstream devices. For example, only the upstream lanes may have light traffic enabling a portion of the upstream link to become inactive while the downstream link is fully active. In that case, the training patterns would only go in one direction. The link width checks shown in FIG. 9 for inactive lanes in both the upstream and downstream directions by both the upstream and downstream devices enable asymmetrical link operation in the power savings mode.

Centralized inactive lane refresh allows the management controller to refresh DLL and phase recovery lock for inactive lanes without affecting operational lanes. That allows the management controller to effectively reduce link reconnection latency for link width increase commands by allowing T0 training (or additional training according to the embodiment) to occur while other link lanes are operational. Link refresh SM commands are used to synchronize the host and chipset transmitter and receiver actions. Refreshing inactive lanes can be applied periodically or opportunistically (e.g., just before a link width increase command) to minimize reconnection latency by reducing or eliminating T0 training time at link reconnection. Each device should take inactive lane refresh training time into account when determining the amount of T0 training time required at link reconnection.

As with disconnect refresh, control software should understand the physical receiver T0 training time requirements for both the host and chipset to optimize power savings and reconnection latency of the link using inactive lane refresh. The required T0 training time is a function of link idle time and can also be affected by other parameters (e.g., the power states utilized for inactive lanes). Note that a control bit in a register may be utilized to indicate whether a device supports inactive lane refresh capability.

Various embodiments of the invention are contemplated to include circuits, systems of circuits and interconnections between circuits, related methods, and/or software stored on computer-readable medium to implement various methods described herein or to provide appropriate control functions to effect the power management techniques described herein typically in combination with the hardware. Depending upon the particular implementation, some functions may be implemented in hardware and some in software and particular implementations may differ as to what is implemented in software and what is implemented in hardware. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method comprising:
    operating one or more portions of a communication link in a power savings mode, the communication link including data lines and one or more clock signal lines coupling a first and a second integrated circuit;
    sending an indication from the first to the second integrated circuit, to exit the power savings mode and enter a training phase, using a sideband signal line coupling the first and second integrated circuits, the sideband signal line being separate from the data lines and the one or more clock signal lines of the communication link;
    periodically entering the training phase in which training patterns are transmitted over the one or more portions of the communication link for a predetermined length of time; and
    returning to the power savings mode after the predetermined length of time has elapsed.

2. The method as recited in claim 1 wherein information is not transmitted over the data lines during the power savings mode.

3. The method as recited in claim 2 further comprising transmitting one or more clock signals, respectively, over the one or more clock signal lines in the power savings mode.

4. The method as recited in claim 1 further comprising the first integrated circuit sending the indication to enter the training phase according to a programmable register specifying a length of time to remain in the power savings mode before entering the training phase.

5. The method as recited in claim 1 further comprising sending an exit indication from the first circuit to the second circuit indicating to exit the training phase and return to the power savings mode using the sideband signal line.

6. The method as recited in claim 5 further comprising the first integrated circuit sending the indication when to exit the training phase according to a programmable register specifying a length of time to remain in the training phase before returning to the power savings mode.

7. The method as recited in claim 1 further comprising remaining in the training phase according to a length of time specified in a programmable register.

8. The method as recited in claim 1 further comprising remaining in the power savings mode between training phases for a length of time specified by a programmable register.

9. An integrated circuit comprising:
    a transmit and receive interface for coupling to a communication link including data lines and one or more clock lines, the transmit and receive interface operable, while the communication link is in a power savings mode, to periodically enter a training phase in which training patterns are transmitted and received over the communication link for a predetermined length of time; and
    the transmit and receive interface being further operable to return to the power savings mode after the predetermined length of time has elapsed;
    an output terminal coupled to supply an indication to a sideband signal line, which is separate from the data lines and the one or more clock lines of the communication link, to exit the training phase and return to the power savings mode in response to expiration of the predetermined length of time.

10. The integrated circuit as recited in claim 9 further comprising a programmable register specifying the predetermined length of time for being in the training phase.

11. The integrated circuit as recited in claim 9 further comprising a programmable interval register, the integrated circuit responsive to remain in the power savings mode before entering each training phase according to a value of the programmable interval register.

12. The integrated circuit as recited in claim 11 having an output terminal coupled to supply an indication on the sideband signal line to enter the training phase from the power savings mode in response to expiration of a time period specified by the value of the interval register.

13. An integrated circuit comprising:
    a transmit and receive interface for coupling to a communication link including data lines and one or more clock lines, the transmit and receive interface operable, while the communication link is in a power savings mode, to periodically enter a training phase in which training patterns are transmitted and received over the communication link for a predetermined length of time;
    an input terminal coupled to receive a sideband signal on a sideband signal line, separate from the data lines and the one or more clock lines of the communication link, the integrated circuit being responsive to an indication on the sideband signal line to enter the training phase; and
    the transmit and receive interface being further operable to return to the power savings mode after the predetermined length of time has elapsed.

14. The integrated circuit as recited in claim 13 wherein the integrated circuit is responsive to another indication on the sideband signal line to exit the training phase and return to the power savings mode.

15. A computer system comprising:
    a first and a second integrated circuit;
    a communication link coupling the first and second integrated circuit and including data lines and one or more clock lines;
    wherein the first integrated circuit and second integrated circuits are operable to exit a power savings mode for the communication link, enter a training phase in which training patterns are transmitted over the communication link for a predetermined time period and return to the power savings mode after the predetermined time period has elapse; and at least one sideband signal line, separate from the data lines and the one or more clock lines of the communication link, the sideband signal lines coupled between the first and second integrated circuits, the second integrated circuit being responsive to a first indication on the at least one sideband signal line to enter the training phase and a second indication on the at least one sideband signal line to exit the training phase and return to the power savings mode.

16. The computer system as recited in claim 15 wherein the predetermined time period is programmable.

17. The computer system as recited in claim 15 wherein the first and second integrated circuits enter the training phase periodically from the power savings mode according to a programmable interval register located in at least one of the first and second integrated circuits.

* * * * *

UNITED STATES PATENT AND TRADEMARK OFFICE
CERTIFICATE OF CORRECTION

PATENT NO.      : 7,607,031 B2                                          Page 1 of 1
APPLICATION NO. : 11/482269
DATED           : October 20, 2009
INVENTOR(S)     : Mackey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Fourteenth Day of December, 2010

David J. Kappos
*Director of the United States Patent and Trademark Office*